Dec. 19, 1967                     G. T. LANZ                    3,359,115
METHOD FOR PREPARING AN ANIMAL FOOD COMPRISING
SUBSTANTIALLY UNOXIDIZED FISH MEAL AND
CONDENSED FISH SOLUBLES
Filed April 1, 1964
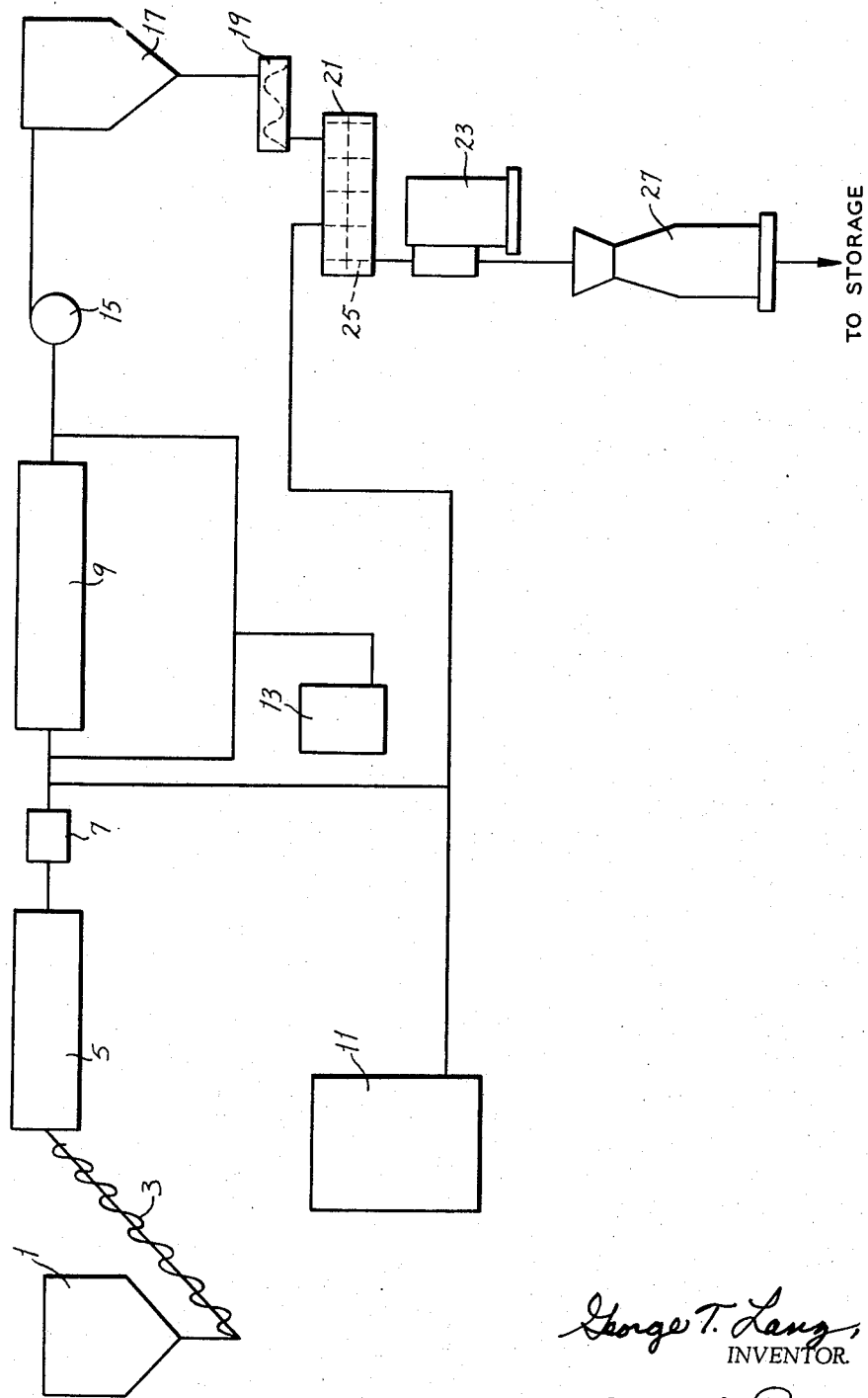
George T. Lanz,
INVENTOR.
BY John O. Pope III,
ATTORNEY.

3,359,115
METHOD FOR PREPARING AN ANIMAL FOOD COMPRISING SUBSTANTIALLY UNOXIDIZED FISH MEAL AND CONDENSED FISH SOLUBLES
George T. Lanz, Kirkwood, Mo., assignor to Ralston Purina Company, St. Louis, Mo., a corporation of Missouri
Filed Apr. 1, 1964, Ser. No. 356,578
10 Claims. (Cl. 99—7)

This invention relates to treatment of particles and more particularly to animal feeds and specifically to such feeds combining valuable components in a useful form.

In general the invention comprises animal feeds in pellet form in which nutritional particles are bound together by condensed fish solubles, and methods of preparing these.

Among the several objects of the invention may be noted the provision of pelleted animal feeds having fresh or uncured organic particles, such as comminuted fish meal, for example, bound together by condensed fish solubles and methods for producing them; the provision of such a feed wherein the units resist crumbling and are therefore able to withstand the rigors of handling during shipment; the provision of such a method for producing products of the class described wherein the volume of the product is low compared to the food value thereof; and the provision of a method such as described which may be carried out by means of relatively simple equipment which is reliable and convenient to control. Other objects and features will be in part apparent and in part pointed out hereinafter.

The invention accordingly comprises the products and methods hereinafter described, the scope of the invention being indicated in the following claims.

In the accompanying drawing, in which one of various possible embodiments of the invention is illustrated, The figure is a flow sheet illustrating one embodiment of the method of the present invention for producing an animal feed.

While this invention is not limited in application to particular organic particles, it will be described in relation to fish scrap or meal for exemplary purposes.

Pelleting fish scrap or meal is desirable because it reduces the volume of the meal by about one-fifth to one-fourth, thereby permitting greater loads of meal to be shipped in a carrier. The reduction in volume of the meal reduces the labor of "turning" the meal in open air bulk storage. Turning comminuted meal particles is necessary to prevent burning or rapid oxidation of the meal and subsequent charring, resulting in loss of protein and palatability. Furthermore, fish meal, in an unpelleted condition, often becomes airborne due to high winds when the meal is transferred from one carrier to another or to a storage vessel in open air. On the other hand, pellets of fish meal are considerably larger and heavier than comminuted particles of fish meal and thus are not subject to being airborne as readily as particles of fish meal. Accordingly, transferring pelleted fish meal from one carrier to another or to storage in open air results in lower losses than occur when comminuted particles of fish meal are transferred in the same manner.

Pelleting of fish meal has been attempted for many years with very limited success. Pelleting fresh or uncured meal has been almost impossible. The polyunsaturated fats or oleaginous matter in fresh uncured meal act as a lubricant, thus causing the fresh meal to have a very low resistance to flow. Accordingly, it has been almost impossible to form the meal into tough or strong pellets because the resistance to flow in the tapered die holes of the pellet mill is so low and the retention time in the die is short.

When the polyunsaturated fats in fresh uncured meal are oxidized the fish meal is cured. Pelleting oxidized or cured fish meal is both possible and practical since oxidized fats act as a binder. However, oxidized fish oils or fats under certain conditions have been proven to be toxic. Furthermore, the digestibility of the protein content may be seriously affected. Additionally, toxic peroxides may be formed along with the polymers as a result of the rapid oxidation in curing the fish meal.

It has been found that the use of antioxidants, such as ethoxyquin, for example, permit stabilization of fresh fish meal for an indefinite period in an uncured state. Many benefits are obtained by the use of ethoxyquin for stabilizing fresh fish meal. For example, toxic peroxides, polymers and undigestible residues of oxidized fish oil are prevented. The original polyunsaturation and the original caloric food energy value of the fat content are retained. The protein digestibility and quality of stabilized fish meal are better than the digestibility and quality of protein in non-stabilized fish meal. Stabilized fish meal can also be fed in larger and greater amounts in poultry rations without affecting the flavor of the meat. Stabilized meal also prevents heat buildup in stored meal and has a protective effect on the fat-soluble vitamins in the ration with which it is mixed, rather than a destructive effect such as occurs with non-stabilized fish meal. Finally, stabilized fish meal eliminates a curing period in the freshly produced meal.

While uncured fish meal treated with an antioxidant has all the benefits referred to in the next preceding paragraph, it still is not per se capable of being formed into pellets because the polyunsaturated fats act as a lubricant.

According to the present invention the addition of condensed fish solubles to the fresh fish scrap or meal produces a mixture which can be formed into durable pellets. Condensed fish solubles have about 50% dry matter and 50% water. They also have about 29% protein and a high content of certain B-complex vitamins. They may contain about as much riboflavin as dried skim milk and they are rich in pantothenic acid and especially high in niacin.

Condensed fish solubles, even though containing 50% water, from the nutritional standpoint, have been a source of desirable growth stimulants. However, the cost of shipping half water limits their use. According to the method of this invention, a substantial amount of the water may be removed from the mixture of fish scrap or meal and condensed fish solubles to reduce the volume of the mixture. Additional moisture may be removed from the mixture after it has been formed into pellets and biological stability maintained, as well as all the other benefits of fresh meal.

Referring to the drawing, a supply bin of fish scrap or meal is illustrated at 1. The particles of fish scrap are fed by a conveyor 3 to a press 5 where the fish meal is pressed. The pressed fish scrap or meal, upon leaving the press 5 may be fed to a de-watering grinder 7, although such a grinder is optional. The fish scrap is then fed into a rotary dryer 9. As the fish scrap enters the dryer, condensed fish solubles are delivered from a storage tank 11 and sprayed on the fish scrap. An anti-oxidant, such as ethoxyquin, may also be added at this point from a supply 13. The amount of condensed fish solubles added to the fish scrap or meal may be about three parts by weight or less of condensed fish solubles for every seven parts by weight of fish scrap or meal. The temperature within the dryer is usually in the range of 500–600° F., but may be higher. A substantial amount of water is evaporated from the mixture while it is in the dryer so that the mixture has about 6 to 8% moisture content upon leaving the dryer. Rather than adding the antioxidant to the fish scrap or meal just as it enters the dryer, the antioxidant may be added to the mixture after it is discharged from the dryer.

The mixture of fish scrap or meal, condensed fish solubles and antioxidant is then fed into a grinder 15 where it is ground, reduced in size and further mixed. Upon being fed out of the grinder the mixture usually includes one-sixth to one-fourth pound of condensed fish solubles for every one pound of fish scrap or meal, but these proportions may be varied. Considerable moisture was driven off from the condensed fish solubles in dryer 9.

The mixture of fish scrap or meal, condensed fish solubles and antioxidant is then delivered to a surge bin 17 from which it is fed by a feeder 19 to a conditioner 21 of a pellet mill 23. Additional condensed fish solubles may be added to the mixture just as it enters conditioner 21. In the conditioner the mixture is heated and conditioned for pelletizing. The additional condensed fish solubles added to the mixture as it enters conditioner 21 increase the lubricity of the product and act as a binder when the pellets are cooled and dried. A rotating mixer 25 in conditioner 21 thoroughly mixes the condensed fish solubles added to the conditioner with the mixture supplied by the feeder. Upon leaving the conditioner 21 the mixture is formed into pellets by pellet mill 23. The pellet mill 23 is conventional and under pressure produces short cylindrical pellets. Other shapes of pellets, such as rectangular or oval may be produced if desired depending upon the die used in the pellet mill. During the pelleting process in pellet mill 23, particles are squeezed through dies which compress and heat the pellets. Strands or lengths of compressed particles are automaticlly cut to pellet length. As the pellets are ejected or discharged from the pellet mill they are in the form of tacky, slightly moist, plastic material. The pellets are in a heated condition, such as in the range of 140–180° F. when ejected from the pellet mill and are then passed through a cooler 27 where a blast of air cools the pellets to ambient temperature. The moisture content in the pellets is between about 10 and 12% upon leaving the cooler. Upon leaving cooler 27 the pellets may be delivered to a storage unit.

While as indicated above about three parts or less by weight of condensed fish solubles are added to the fish scrap, just as the latter enters the dryer 9, for every seven parts by weight of fish scrap, the amount of condensed fish solubles added may be varied. For example, if about two parts by weight of condensed fish solubles are added to the fish scrap, just as the latter enters dryer 9, for every seven parts by weight of fish scrap or meal, then the amount of condensed fish solubles added to conditioner 21 is about one part by weight for each seven parts by weight of the original fish scrap or meal. If only one part by weight of condensed fish solubles is added to dryer 9, then about two parts by weight of condensed fish solubles are added to conditioner 21 for each seven parts by weight of the original fish scrap or meal. In any event, the total amount of condensed fish solubles added to the fish meal at the dryer 9 and conditioner 21 is about three parts by weight for every seven parts by weight of fish scrap or meal.

If it is desired to reduce the fat content in the fish scrap or meal, the pellets upon leaving cooler 25 may be delivered to a fat extraction tower such as described in copending coassigned application, Ser. No. 278,314, filed May 6, 1963, entitled Treatment of Particles. The pellets are treated with a solvent in the manner described in said application. If desired the press 5 may be replaced by a conditioner, not shown, adapted to condition the fish scrap or meal prior to the initial addition of the condensed fish solubles. Alternatively, antioxidant and condensed fish solubles may be added directly to fish scrap or meal after the latter has been conditioned in such a conditioner. The mixture is then delivered directly to a pellet mill for pelletizing. After passing through the pellet mill, the mixture in the form of pellets may be treated in the same manner as described above. The term fish meal as used in the specification and claims includes fish scrap.

While the addition of an antioxidant has some advantages as pointed out above, it has been found that it is not essential to the formation of the pelleted mixture. Accordingly, the addition of an antioxidant is optional.

It will thus be seen that the addition of the condensed fish solubles to the uncured fish meal produces a mixture capable of being formed into pellets which can withstand handling during shipment and which still have the valuable properties of uncured fish meal. Moreover, the adaptability of the mixture to be pelleted is not only made possible by the addition of condensed fish solubles, but the quality of the pellets per se is increased by this addition.

In view of the above, it will be seen that the several objects of the invention are achieved and other advantageous results attained.

As various changes could be made in the above methods and products without departing from the scope of the invention, it is intended that all matter contained in the above description or shown in the accompanying drawing shall be interpreted as illustrative and not in a limiting sense.

What is claimed is:

1. The method of preparing an animal feed comprising mixing condensed fish solubles in an amount to permit extrusion into pellets with substantially unoxidized fish meal to form a mixture, and extruding said mixture.

2. The method of preparing an animal feed comprising mixing together an antioxidant, comminuted substantially unoxidized fish meal and condensed fish solubles in an amount to permit extrusion into pellets to form a mixture, and extruding said mixture under pressure into pellets.

3. The method of preparing an animal feed comprising heating comminuted substantially unoxidized fish meal, adding condensed fish solubles in an amount to permit extrusion into pellets to said heated meal to form a mixture, heating the mixture to reduce the moisture content thereof, and extruding said mixture under pressure into pellets.

4. The method of preparing an anmial feed comprising heating comminuted substantially unoxidized fish meal, adding condensed fish solubles in an amount to permit extrusion into pellets to said fish meal to form a mixture, drying said mixture to remove moisture therefrom, and extruding said mixture under pressure into pellets.

5. The method of preparing an animal feed comprising heating comminuted substantially unoxidized fish meal containing fat and moisture, adding condensed fish solubles in an amount to permit extrusion into pellets to said fish meal to form a mixture, heating said mixture to reduce the moisture content thereof, adding an antioxidant to form a second mixture of fish meal, condensed fish solubles, and antioxidant, grinding said second mixture, and extruding said second mixture under pressure into pellets.

6. The method of preparing an animal feed comprising adding condensed fish solubles in an amount to permit extrusion into pellets to uncured comminuted fish meal to form a mixture, drying said mixture until the moisture content thereof is approximately 6–8%, adding an antioxidant to said mixture to form a second mixture of fish meal, condensed fish solubles and antioxidant, grinding said second mixture, and extruding said second mixture under pressure into pellets.

7. The method of preparing an animal feed comprising mixing together comminuted substantial unoxidized fish meal and condensed fish solubles to form a first mixture, heating said mixture to reduce the moisture content thereof, adding additional condensed fish solubles to said first mixture after heating the latter to form a second mixture, the amount of fish solubles permitting extrusion into pellets, and extruding said second mixture into pellets.

8. The method of preparing an animal feed comprising mixing condensed fish solubles with comminuted substantial unoxidized fish meal to form a mixture, mixing an antioxidant with said mixture to form a second mixture, adding additional condensed fish solubles to said second mixture to form a third mixture, the amount of fish solubles permitting extrusion into pellets, heating said third mixture, and extruding said third mixture into pellets.

9. The method of preparing an animal feed comprising mixing about three parts by weight of condensed fish solubles with about seven parts by weight of comminuted substantially unoxidized fish meal, a portion of said condensed fish solubles being initially mixed with said fish meal to form a first mixture, heating said first mixture to reduce the moisture content thereof, grinding said first mixture, mixing the remaining portion of said condensed fish solubles with said first mixture to form a second mixture and extruding said second mixture under pressure into pellets.

10. The method of preparing an animal feed comprising mixing about three parts by weight of condensed fish solubles with about seven parts by weight of comminuted substantially unoxidized fish meal, a portion of said condensed fish solubles being initially mixed with said fish meal to form a first mixture, heating said first mixture to reduce the moisture content thereof, adding an antioxidant to said first mixture to form a second mixture, grinding said second mixture, mixing the remaining portion of said condensed fish solubles with said second mixture to form a third mixture, heating said third mixture, and extruding said third mixture into pellets.

References Cited
UNITED STATES PATENTS

| | | | |
|---|---|---|---|
| 2,167,723 | 8/1939 | Meakin | 99—4 |
| 2,168,532 | 8/1939 | McMath et al. | 99—2 |
| 3,141,775 | 7/1964 | Surgant | 99—2 |

OTHER REFERENCES

Maurice E. Stansby, Industrial Fishery Technology 1963, pp. 227–228 and 232–233.

A. LOUIS MONACELL, *Primary Examiner.*

H. H. KLARE, *Assistant Examiner.*